(12) United States Patent
Barde et al.

(10) Patent No.: US 7,979,619 B2
(45) Date of Patent: Jul. 12, 2011

(54) EMULATING A LINE-BASED INTERRUPT TRANSACTION IN RESPONSE TO A MESSAGE SIGNALED INTERRUPT

(75) Inventors: Kaushik Barde, Sunnyvale, CA (US); Richard Bramley, Mansfield, MA (US); Matthew Ryan Laue, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 12/317,646

(22) Filed: Dec. 23, 2008

(65) Prior Publication Data

US 2010/0161864 A1   Jun. 24, 2010

(51) Int. Cl.
*G06F 13/24* (2006.01)
(52) U.S. Cl. ........................................ 710/261; 710/266
(58) Field of Classification Search .......... 710/260–269, 710/48–50
See application file for complete search history.

(56) References Cited

U.S. PATENT DOCUMENTS

| 7,048,877 | B2 * | 5/2006 | Zimmer et al. ............... 710/260 |
| 7,222,203 | B2 * | 5/2007 | Madukkarumukumana et al. ............................ 710/260 |
| 2009/0119087 | A1 * | 5/2009 | Ang et al. ....................... 703/23 |
| 2010/0083247 | A1 * | 4/2010 | Kanevsky et al. ................ 718/1 |

OTHER PUBLICATIONS

The MSI Driver Guide HOWTO, Rev.3 (Tom L Nguyen) 2004, entire document, especially pp. 1 and 2.
82093AA I/O Advanced Programmable Interrupt Controller, Order No. 290566-001 (Intel Corporation) 1996 , entire document, especially pp. 3, 9 to 11 and 13.

* cited by examiner

*Primary Examiner* — Raymond N Phan

(57) ABSTRACT

Methods, systems, apparatuses and program products are disclosed for managing interrupt services in hypervisor and hypervisor-related environments in Message Signaled Interrupts are emulated as other type(s) of interrupt.

According to an aspect of the present invention, a method of executing a program includes receiving a MSI (message signaled interrupt). Responsively, a virtual interrupt is generated and an ISR (interrupt service routine) is invoked that handles a line-based virtual interrupt transaction. A surrogate or virtual peripheral device status may also be provided and may be associated with the virtual interrupt. A single device interrupt event may, in certain circumstances, be serviced both as a line-based interrupt and also as an MSI, or as either responsive to run-time context.

Embodiments of the present invention enable superior tradeoffs in regards to the interrupt sharing to a greater and more flexible extent than with previous implementations. Moreover, it makes possible interrupt sharing using an ISR that was not expressly designed for interrupt sharing.

12 Claims, 5 Drawing Sheets

EMULATING A LINE-BASED INTERRUPT TRANSACTION IN RESPONSE TO A MESSAGE SIGNALED INTERRUPT

FIELD OF THE INVENTION

The present invention generally relates to personal computers and devices sharing similar architectures and, more particularly, to a system and method for managing input-output data transfers to and from programs that run in virtualized environments.

BACKGROUND OF THE INVENTION

Modernly, the use of virtualization is increasingly common on personal computers. Virtualization is an important part of solutions relating to energy management, data security, hardening of applications against malware (software created for purpose of malfeasance), and more.

One virtualization approach is to provide a small hypervisor which is tightly integrated to a few small and hardened application programs, for example, email client programs and movie disc players. The hypervisor may also host, but is only loosely connected to, a closed operating system which is typically a complex and full-featured general purpose computer environment or operating system such as Microsoft® Windows® Vista® or a similar commercial software product. A closed operating system is an operating system for which the source code is unavailable to most users and for that reason can be difficult to modify reliably. This can be contrasted with application programs, for example, a word processing or accounting program and operating systems based on the Open Source approach, for example, Linux® or other suitable operating systems.

By design, conventional hypervisors may support multiple closed operating systems per operating session and virtualize all supported peripheral devices. This may prevent efficient non-virtualized access to some resources (typically by the closed operating system) while properly virtualizing and especially sharing those or other resources.

I/O (input-output) device emulation is commonly used in hypervisor based systems such as the Open Source Xen® hypervisor software. Use of emulation, including I/O emulation, can result in a substantial performance hit. On the other hand it is desirable to emulate or virtualize some peripheral devices or resources from time to time in response to changes in operating conditions. For example, an Internet browser being used for an interactive user session may be a high-priority foreground task or activity; whereas the same Internet browser program might be considered a low-priority background activity while downloading a multi-megabyte sized file especially if the download is time-shared with user focused interactivity. In such an exemplary case the device that connects to the Internet might be virtualized only when the browser operates with low-priority.

Given the current state of technology, there is a need for interrupt handling techniques that serve two operating systems (e.g. one closed and one open) that may simultaneously be present on a given platform. Whenever a closed operating system does not have provision for interrupt sharing for all classes of devices, this can be a significant challenge. In particular, MSIs (message-signaled interrupts) commonly are used with interrupt handlers that are not designed for interrupt sharing for the reason that one of the design aims of MSI was to get rid of any need to share interrupts.

One solution to the aforementioned shortcoming is to modify the closed operating system. However, there may be strong commercial reasons, especially quality assurance related reasons, not to do that.

SUMMARY OF THE INVENTION

The present invention provides a method of executing a program for interrupt management and also apparatus(es) that embody or otherwise implement the method. In addition program products and other means for exploiting the invention are presented.

According to an aspect of the present invention, a method of executing a program includes receiving a MSI (message signaled interrupt). For example, servicing an MSI within a hypervisor, the MSI being received from an audio controller chip that is part of an output sound subsystem. Next, an ISR (interrupt service routine) is invoked that handles a line-based virtual interrupt transaction that may be a shared interrupt. For example the invoked ISR may be part of a closed operating system and the interrupt it receives may be a virtual interrupt created by the hypervisor. A surrogate or virtual peripheral device status may also be provided and may be associated with the virtual interrupt.

An advantage provided by the present invention is that it enables interrupt sharing to a greater and more flexible extent than with previous implementations.

Another advantage provided by the present invention is that it provides for interrupt sharing using an ISR that was not expressly designed for interrupt sharing.

A feature of the present invention is that a single device interrupt event may, in certain circumstances; be serviced both as a line-based interrupt and also as an MSI, or as either responsive to a run-time context.

The disclosed invention includes, among other things, methods and techniques for providing interrupt handling techniques to address these issues and for a subset of devices and/or resources. This includes embodiments of the present invention enabling superior tradeoffs in regards to at least the problems and shortcomings outlined above.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and in which.

For convenience in description, identical components have been given the same reference numbers in the various drawings.

DETAILED DESCRIPTION OF THE INVENTION

In the following description, for purposes of clarity and conciseness of the description, not all of the numerous components shown in the schematics, charts and/or drawings are described. The description of well-known components is not included within this description so as not to obscure the disclosure or take away or otherwise reduce the novelty of the present invention and the main benefits provided thereby. An exemplary embodiment of the present invention will now be described with reference to FIGS. 1-6.

Figure 1:
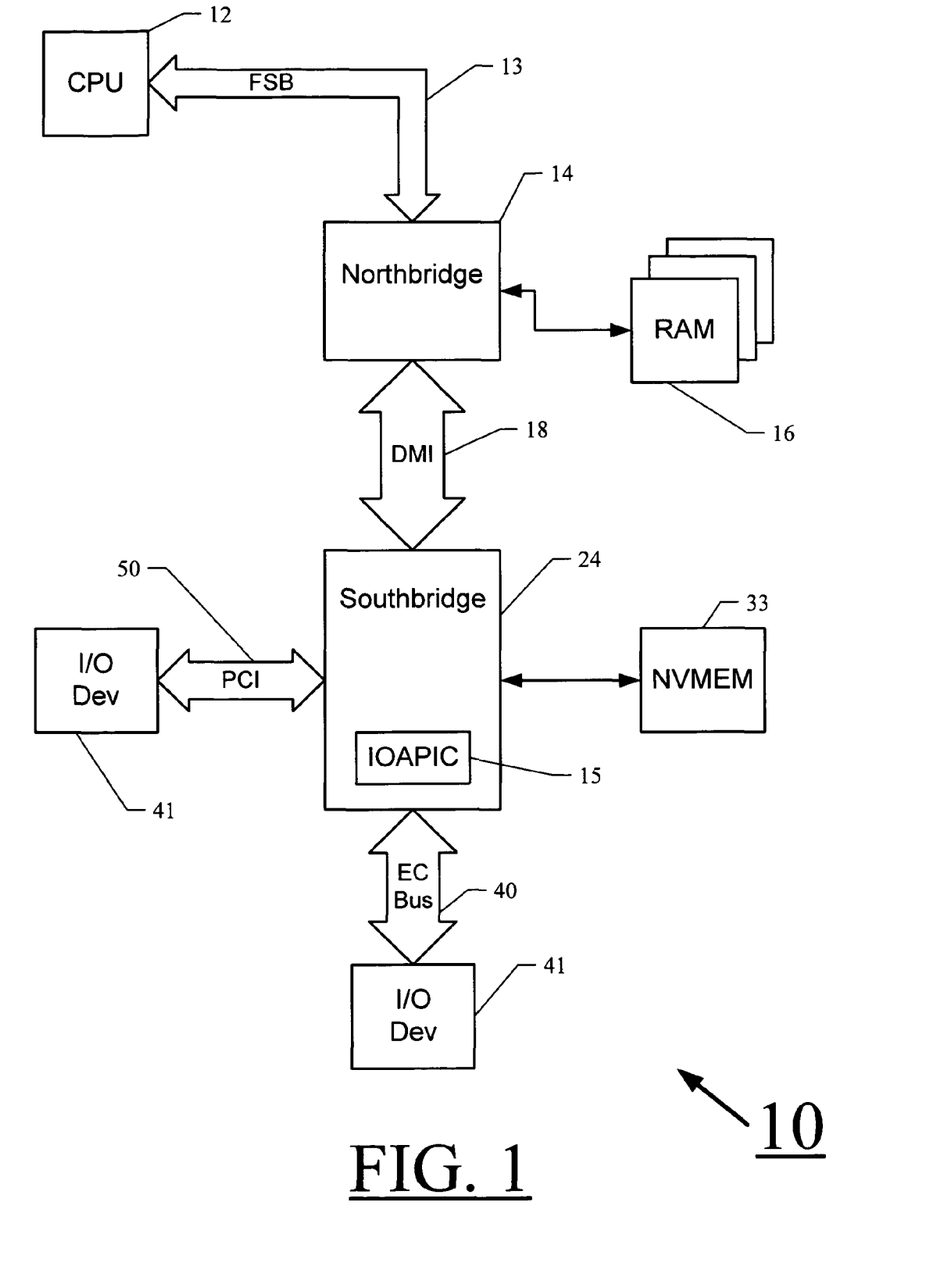
FIG. 1 is a schematic block diagram of an electronic device configured to implement the interrupt logic functions according to an exemplary embodiment of the present invention.

FIG. 1 is a schematic block diagram of an electronic device configured to implement the interrupt logic functions according to the present invention. The exemplary electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as other suitable devices for operating or interoperating with the invention. The electronic device 10 may include at least one processor or CPU (Central Processing Unit) 12, configured to control the overall operation of the electronic device 10. Similar controllers or MPUs (Microprocessor Units) are commonplace and may be used in place of the at least one processor 12.

The processor 12 may typically be coupled to a bus controller 14 such as a Northbridge chip by way of a bus 13 such as a FSB (Front-Side Bus). A Northbridge chip 14 typically provides an interface for read-write system memory 16 such as semiconductor RAM (random access memory).

The bus controller 14 may also be coupled to a system data highway 18, for example a DMI (Direct Media Interface) in typical Intel® style embodiments. Coupled to the DMI 18 may be a Southbridge chip such as an Intel® ICH8 (Input/Output Controller Hub type 8) chip 24. In an exemplary embodiment, the Southbridge 24 may be connected to a PCI (peripheral component interconnect) bus 50 and an EC (Embedded controller) bus 40, each of which may in turn be connected to various input/output devices 41, for example, a display, a printer, a keyboard, a mouse, a biometric reader and other suitable devices and combinations thereof. In an exemplary embodiment, the Southbridge 24 may also be connected to at least one form of NVMEM (non-volatile read-write memory) 33, such as a Flash Memory and/or a Disk Drive memory.

The Southbridge chip 24 may also provide an IOAPIC (Input-Output Advanced Programmable Interrupt Controller) 15 for processing line-based interrupts. Typically the Southbridge chip 24 will also provide the peripheral devices that use MSI (Message Signaled Interrupts) to, and/or MSI-X (MSI-Express). Both line-based interrupts and MSIs are well-known to those or ordinary skill in the art.

Storage recorders and communications devices including data transmitters and data receivers may also be used (not shown in FIG. 1, but see FIGS. 5 and 6) such as may be used for data distribution and software distribution in connection with distribution and redistribution of executable codes and other programs that may embody the parts of invention.

Figure 2:
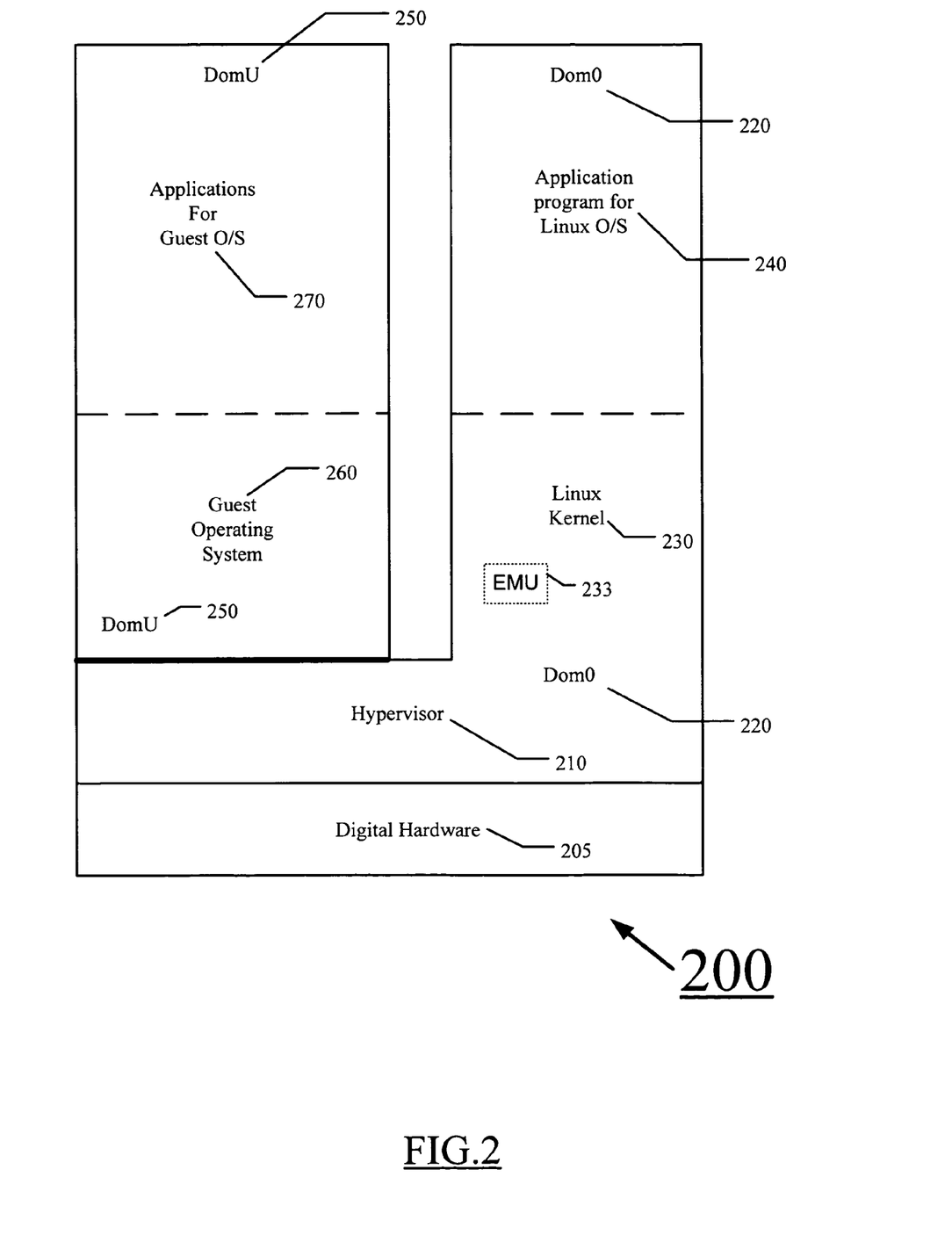
FIG. 2 is a block diagram that shows the architectural structure of components of an exemplary embodiment of the present invention.

FIG. 2 is a block diagram that shows the architectural structure 200 of the software components of the present invention. FIG. 2 does not represent layout order or even juxtaposition in physical memory or memory addresses; rather, it illustrates logical software architectural interrelationships in an exemplary embodiment of the invention. A hypervisor 210 is found near the bottom of the block diagram to indicate its relatively close architectural relationship with the computer (e.g. digital) hardware 205. The hypervisor 210 forms an important part of Dom0 220, which (in one embodiment of the invention) is a modified version of a Xen® and/or Linux® software stack.

Dom0 or Domain Zero is a term used in the hypervisor arts to refer to the "privileged domain", which is typically embodied as a VM (Virtual Machine) that has greater privileges than all other domains or VMs (known as DomU 250 for "unprivileged domain"). Within Dom0 lies the Linux® kernel 230 program, upon which the applications 240 programs for running on a Linux® kernel may be found. Also within the Linux kernel 230 lies an EMU (I/O emulator subsystem) 233 which is a software or firmware module whose main purpose (or function) is to emulate I/O (Input-Output) operations. QEMU™ is a very well known brand of EMU software and is used in the exemplary embodiment of the invention.

Generally speaking, the application program 240 (usually only one at a time) within Dom0 220 runs in a relatively privileged mode, and such programs are relatively simple and hardened applications, for example, email client programs and movie disc players. CPU and software modes and their associated levels of privilege are well known to those of ordinary skill in the relevant art and will not be discussed in great detail herein. Dom0 220 is thus, in an exemplary embodiment of the present invention, a privileged domain. That is to say that Dom0 220 runs, partly or wholly, in a privileged CPU mode, for example Ring 0 in an IA-32 architecture. In one embodiment, Dom0 comprises the hypervisor 210, the Linux® kernel 230 including I/O emulation features 233, and hardened applications 240.

Also running under the control of the hypervisor 210 is the untrusted or unprivileged domain—DomU 250. Within the DomU 250 may lie the guest operating system 260, and under the control of the guest operating system 260 may be found (commonly multiple instances of) applications 270 that are compatible with the guest operating system. In an exemplary embodiment, the guest operating system 260 is the closed operating system referred to (supra) and the terms are sometimes used interchangeably. A guest operating system may be, for example, a version of Vista® operating system which is a commercial software product of Microsoft Corporation.

Thus, in an exemplary embodiment of the present invention, the guest operating system stack 250 and the Dom0 stack 220 exist as separate VMs (Virtual Machines) under control of the hypervisor 210. The Dom0 stack 220 may include system services (that are typically Linux® derived), including ISRs (Interrupt Service Routines) together with compatible hardened applications, for example a movie disc player program that services interrupts related to audio output and CD reading. The guest operating system stack may run in DomU and might typically comprise the guest operating system (including ISRs) together with Windows® compatible applications programs, for example the Microsoft® Outlook Email program. Issues arise as to the use by the two operating system stacks of a single (shared) peripheral device, for example a CD (Compact Disk) drive or an output sound system. Since they run in separate VMs the two operating systems are typically unaware—each of the other, and indeed may contain no support for running under a hypervisor at all; thus, relying on hypervisor invisibility from the operating systems's standpoint.

By design, some peripheral devices may be handled by virtualization of all I/O (input/output) associated therewith and others may be handled, at times, by a pass-thru technique wherein MMIO (memory-mapped Input-Output) and PIO (Programmed Input-Output) execute without causing traps. Such traps may commonly be designed to provide hooks for simulation, emulation or similar capabilities. PIO is used by I/O instructions as contrasted with memory access instructions on CPUs that have separate memory spaces intended primarily for providing I/O device addressing and memory addressing. Allowing, at various times, access to peripheral devices from either or both operating system stacks raises implementation issues beyond the scope of the present invention. Successful ISR management without VM to VM resource conflicts and other conflicts is also a challenge and discussed further below.

Generally speaking, operating systems are designed for only limited support of interrupt sharing, commonly referred to as IRQ sharing (Interrupt ReQuest sharing). Additionally, a design objective for MSI is to eliminate any need for interrupt sharing and so ISRs written to MSI standards are typically not capable of sharing interrupts. Two problems in particular can be thorny, one is that since the guest operating system is typically not open source then device drivers for particular peripherals used with the guest operating system may be non-open source also. That makes modifying such drivers difficult and/or unreliable. A second problem is that—if it is required to virtualize interrupts so they can be shared across VMs—then it becomes particularly difficult in the event that a single device is used both pass-thru and non-pass thru, or, equally, if a single interrupt identity is to be shared between a pass-thru device and a non-pass thru device.

In an exemplary embodiment of the present invention, these exigencies are tackled by providing that a subject peripheral device is enabled for generating MSIs that are handled by within an ISR that is part of a hypervisor. However, handling such an actual MSI interrupt may cause a virtual line-based interrupt to be simulated or emulated responsively into the VM (DomU) of the guest operating system. Thus, the guest operating system may service virtual line-based interrupts even though the peripheral device is not generating any line-based interrupts, but rather is generating MSI type interrupts.

Virtual line-based interrupts are not limited to vectors that correspond to actual signal pins but rather VIOAPIC (virtual input-output advanced peripheral interrupt controller) protocols permit a wider addressing range as is well-known in the PC (Personal Computer) arts. At the same time a (potentially customized) ISR may coexist in Dom0 which services MSIs but which is aware of device sharing and allows for contemporary interrupt service by a corresponding ISR in DomU. Indeed the Dom0 ISR may provide additional features such as policy-based apportionment of resource sharing such as by neither hogging the device resource nor allowing Dom0 to be shut out in the event that the guest operating system unknowingly (or otherwise) hogs the device resource. Device and resource hogging are well-known in the operating system implementation arts.

Figure 3:
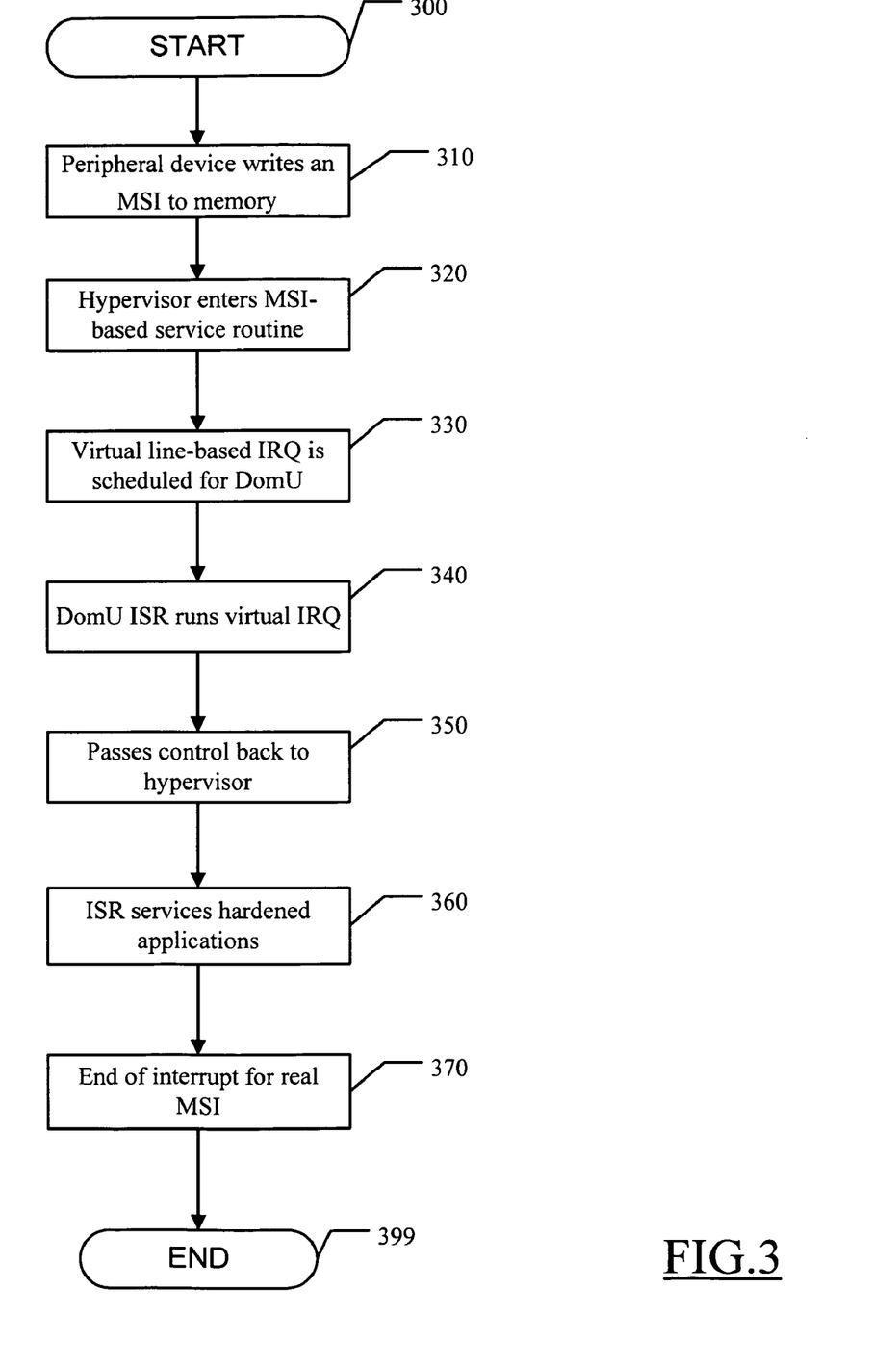
FIG. 3 is a flowchart that shows techniques used to implement an exemplary embodiment of the present invention.

FIG. 3 shows a sequence of actions in an exemplary implementation in which a peripheral device is shared by operating systems in both Dom0 and DomU. Or, in an alternative embodiment still conforming to FIG. 3, the peripheral device could to be configured for IRQ (as contrasted with MSI) operation, and then the IRQ would become shared within the system. In order to facilitate this behavior the device is initialized in a way to cause it to operate with MSIs. In contrast, the guest operating system is configured to "see" the peripheral device (which may have either pass-thru or virtualized I/O) as if it were a device that uses line-based interrupts (even though the peripheral device is not presently so-configured).

Still referring to FIG. 3 an exemplary sequence of actions is shown. At box 300, the sequence starts. In the course or ordinary operation of the peripheral device an interrupt occurs and the peripheral device generates an MSI (see box 310) by writing to system memory (RAM in common implementations).

In box 320, in response to the MSI, the hypervisor (running in Dom0) enters an MSI-based service routine, typically in a Ring0 processor state. Then (box 330), a virtual line-based IRQ is scheduled for DomU.

In box 340, responsive to scheduling exigencies, a DomU ISR runs the virtual IRQ and services peripheral I/O and/or other actions for the benefit of the Windows® applications (or Windows® system programs e.g. a swap file transfer) and may execute a protocol addressed to an IOAPIC (input-output advanced peripheral interrupt controller) but actually acting on the VIOAPIC which is provided by hypervisor emulation services (typically part of the well-known QEMU™ Linux® software package). This DomU ISR is typically a part of the device driver software for the peripheral device which software is typically provided for using with Windows® operating system standing alone (i.e. in the absence of hypervisor-based virtualization).

At box 350, the DomU ISR completes its functions and passes control back to the hypervisor (which created the virtual interrupt that invoked the ISR). Since the line-based ISR typically requires that it be the last ISR in the service chain it does not, by design, preclude the possibility of an onward chain or "hooked" ISR.

At box 360 the Hypervisor then invokes the Dom0 ISR which may service hardened applications that run in Dom0. The Dom0 ISR may be lined-based or more typically a modified MSI service routine that provides for resource sharing. The Dom0 ISR may also typically be aware of which of Dom0 or DomU presently holds the (human) user focus of attention or perhaps the higher execution priority and may provide resource sharing service (or may cooperate with resource sharing services in the hypervisor program). According to implementation details the ISR in Dom0 for the subject peripheral may be custom software or it may be an unmodified "standard issue" device driver intended for use within Linux® software stacks.

In box 370, after the Dom0 has run (or executed) the appropriate ISR services for the Dom0 application(s), the end of interrupt process is invoked to complete servicing the real MSI (which typically has been virtualized as described above).

Figure 4:
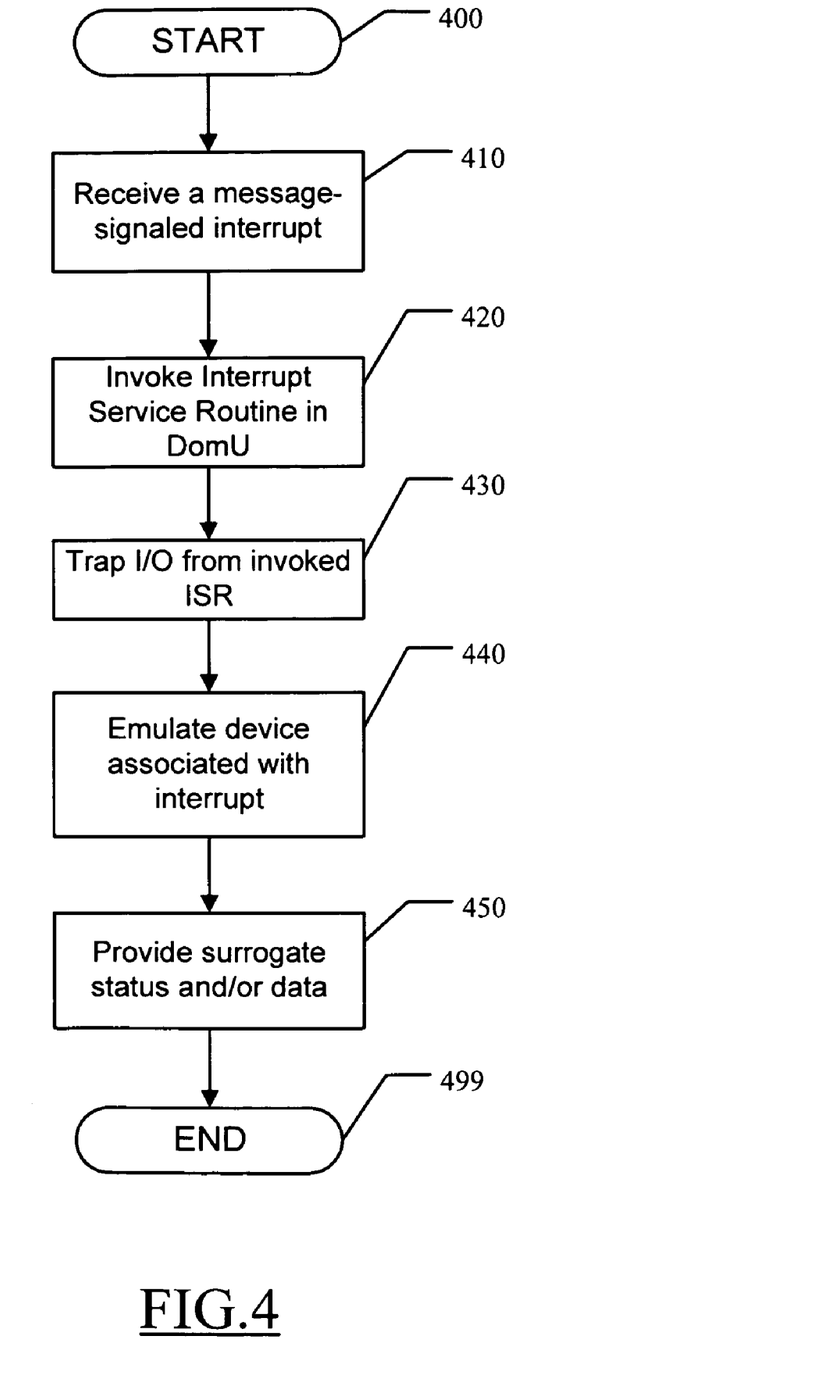
FIG. 4 is a flowchart that shows techniques used to implement an exemplary embodiment of the present invention.

FIG. 4 is another flowchart illustrating the steps performed in implementing an approach to interrupt handling techniques according to another aspect of the present invention. The process starts at step 400 and continues through step 499.

At step 410, a message-signaled interrupt is received by a first ISR such as by the hypervisor program operating in CPU mode Ring 0 in domain Dom0.

At step 420, the first ISR may invoke a second ISR which may be a line-based ISR that operates in DomU. This DomU ISR may typically perform I/O data transfers responsive to the interrupt. Irrespective of whether MMIO or PIO the I/O operations may be pass-thru or virtualized. If virtualized they will be trapped by the hypervisor.

At step 430, the hypervisor traps the I/O function(s) invoked by the DomU ISR. The hypervisor may then perform virtualized I/O by emulating the device associated with the interrupt in step 440. This emulation of the peripheral device may not be strict, that is to say data may or may not be re-propagated from the device.

In some circumstances it may be advantageous to substitute surrogate data, or even surrogate status information and to provide that surrogate status and/or data to the DomU ISR. This is accomplished in step 450. In an exemplary embodiment, if the peripheral device were a CD (Compact Disk) drive, a surrogate status might be a "media ejected" status if it were desired to suppress further I/O requests, even in a situation wherein the disk was not ejected but was actually being read into the other domain (pursuing the exemplary implementation this might be a hardened application in Dom0). At box 499 the method is completed.

Figure 5:
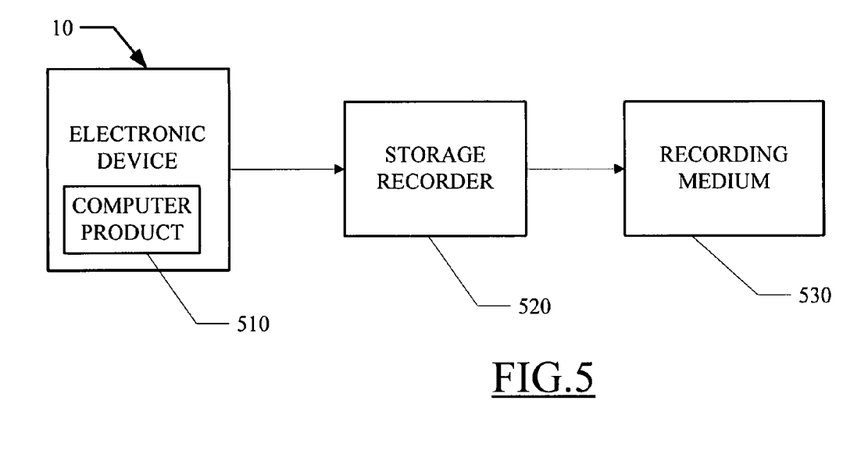
FIG. 5 shows how an exemplary embodiment of the present invention may be encoded onto a computer readable medium or media.

FIG. 5 shows how an exemplary embodiment of the invention may be encoded onto a computer readable medium or media. As illustrated in FIG. 5, computer instructions to be incorporated into in an electronic device 10 may be distributed as manufactured firmware and/or software computer products 510 using a variety of possible computer readable media 530, for example CD (Compact Disc) or PROM (Programmable Read-Only Memory), having the instructions recorded thereon such as by using a storage recorder 520. Often in products as complex as those that deploy and implement the present invention, more than one medium may be used; both in distribution and in manufacturing relevant product. Only one medium is shown in FIG. 5 for clarity but more than one medium may be used and a single computer product may be divided among a plurality of media.

Figure 6:
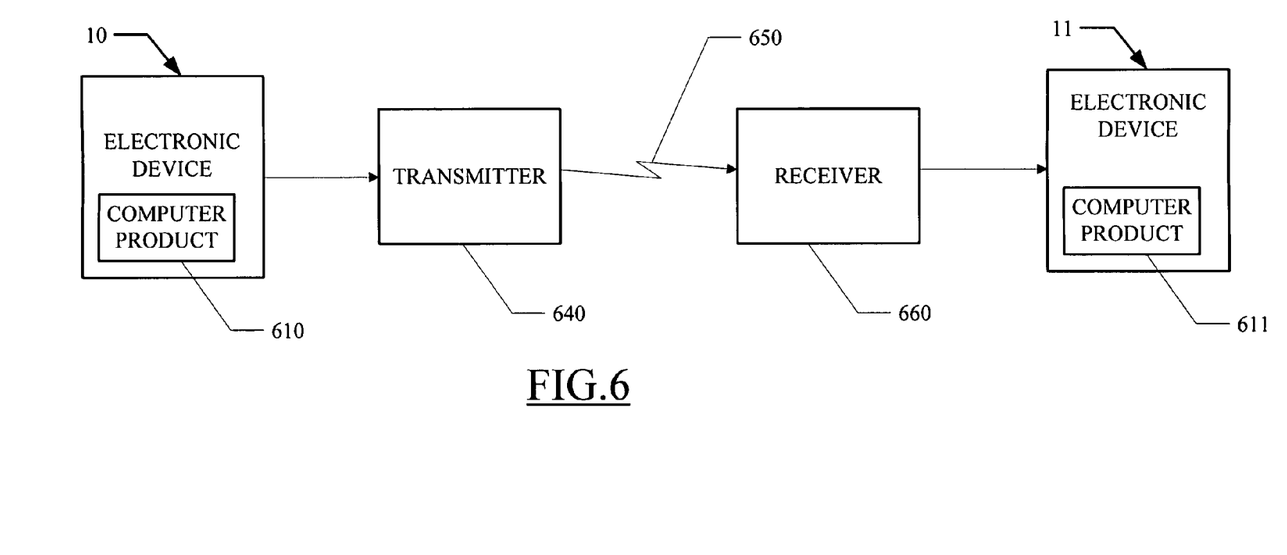
FIG. 6 shows how an exemplary embodiment of the present invention may be encoded, transmitted, received and decoded using electro-magnetic waves.

FIG. 6 shows how an exemplary embodiment of the invention may be encoded, transmitted, received and decoded using electro-magnetic waves. As illustrated in FIG. 6, additionally, and especially since the rise in Internet usage, computer program products 610 may be distributed by encoding the corresponding instructions into signals modulated as a wave. The resulting waveforms may then be transmitted by a transmitter 640, propagated as tangible modulated electromagnetic carrier waves 650 and received by a receiver 660. The carrier waves may be impressed on a metallic or non-metallic pre-formed medium, such as a copper conductor, or may be carried wirelessly through an atmospheric medium such as air. Upon reception, they may be demodulated and the signal decoded into a further version or copy of the computer product 611 in a memory or other storage device that is part of a second electronic device 11 and typically similar in nature to electronic device 10. Other topologies and/or devices, for example, Internet Protocol routers and cables thereto may also be used to construct alternative embodiments of the present invention as is well-known.

The embodiments described above are exemplary rather than limiting and the scope and bounds of the present invention should be determined from the claims. Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of executing a program comprising:
receiving a message signaled interrupt associated with a peripheral device by a first interrupt service routine in a privileged domain;
calling a second interrupt service routine in a non-privileged domain responsive to receiving the message signaled interrupt;
emulating a line-based interrupt transaction into the second interrupt service routine;
trapping, by a hypervisor in the privileged domain, input/output (I/O) functions invoked by the second interrupt service routine; and
performing, by the hypervisor, virtualized I/Os by emulating the peripheral device associated with the message signaled interrupt.

2. The method of claim 1 wherein:
the first interrupt service routine runs in a more privileged processor mode; and
the second interrupt service routine runs in a less privileged processor mode.

3. The method of claim 1 wherein:
the first interrupt service routine is associated with a hypervisor program that runs in a privileged domain; and
the second interrupt service routine is associated with an operating system program.

4. The method of claim 3 wherein the step of:
emulating is performed by service routines that provide a virtualized sharing of the peripheral device.

5. The method of claim 3 wherein:
the second interrupt service routine is shared by multiple interrupt-capable virtual devices.

6. The method of claim 4 wherein:
the virtualized sharing provides a surrogate peripheral device status to the second interrupt service routine; and
the privileged domain processes input-output data to or from the peripheral device.

7. A computer program product comprising:
at least one computer-readable medium having instructions encoded therein, the instructions when executed by at least one processor cause said at least one processor to:
operate for interrupt handling by steps comprising the acts of:
receiving a message signaled interrupt associated with a peripheral device by a first interrupt service routine in a privileged domain;
calling a second interrupt service routine in a non-privileged domain responsive to receiving the message signaled interrupt;
emulating a line-based interrupt transaction into the second interrupt service routine;
trapping, by a hypervisor in the privileged domain, input/output (I/O) functions invoked by the second interrupt service routine; and
performing, by the hypervisor, virtualized I/Os by emulating the peripheral device associated with the message signaled interrupt.

8. The computer program product of claim 7 wherein:
the first interrupt service routine runs in a more privileged processor mode; and
the second interrupt service routine runs in a less privileged processor mode.

9. The computer program product of claim 7 wherein the emulating is performed by service routines that provide a virtualized sharing of the peripheral device.

10. A method comprising:
an act of modulating a signal onto an electro-magnetic carrier wave impressed into a tangible medium, or of demodulating the signal from the electro-magnetic carrier wave, the signal having instructions encoded therein, the instructions when executed by at least one processor causing said at least one processor to:
operate for interrupt handling by steps comprising the acts of:
receiving a message signaled interrupt associated with a peripheral device by a first interrupt service routine in a privileged domain;

calling a second interrupt service routine in a non-privileged domain responsive to receiving the message signaled interrupt;
emulating a line-based interrupt transaction into the second interrupt service routine;
trapping, by a hypervisor in the privileged domain, input/output (I/O) functions invoked by the second interrupt service routine; and
performing, by the hypervisor, virtualized I/Os by emulating the peripheral device associated with the message signaled interrupt.

11. The method of claim 10 wherein:
the first interrupt service routine runs in a more privileged processor mode; and
the second interrupt service routine runs in a less privileged processor mode.

12. The method of claim 10 wherein the emulating is performed by service routines that provide a virtualized sharing of the peripheral device.

* * * * *